(12) United States Patent
Gilbert et al.

(10) Patent No.: US 7,233,435 B2
(45) Date of Patent: Jun. 19, 2007

(54) MICROSCOPE

(75) Inventors: Manfred Gilbert, Schoeffengrund (DE); Gerhard Pfeifer, Solms (DE); Hans-Joachim Kolb, Rauschenberg (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 113 days.

(21) Appl. No.: 10/711,188

(22) Filed: Aug. 31, 2004

(65) Prior Publication Data

US 2005/0057799 A1    Mar. 17, 2005

(30) Foreign Application Priority Data

Sep. 4, 2003    (DE)    ................ 103 40 721

(51) Int. Cl.
*G02B 21/00*    (2006.01)
(52) U.S. Cl. ............... 359/379; 359/380; 359/382; 359/383
(58) Field of Classification Search ............... 359/368, 359/379, 380, 382, 383, 391–393
See application file for complete search history.

(56) References Cited

U.S. PATENT DOCUMENTS 4,482,221 A    11/1984    Clark ................ 350/530

FOREIGN PATENT DOCUMENTS

DE    35 14 431 A1    1/1986
DE    36 07 379 C1    7/1987

*Primary Examiner*—Stephone B. Allen
*Assistant Examiner*—Joshua L. Pritchett
(74) *Attorney, Agent, or Firm*—Simpson & Simpson, PLLC (57) ABSTRACT

The present invention concerns a microscope 1. The microscope 1 encompasses a microscope stand 2, an objective 4 having an optical axis 5, a microscope stage 6 serving to receive a specimen 7, and a focusing device 20 serving to focus the specimen 7. With the focusing device 20, the objective or the microscope stage 6 is positionable relative to the microscope stand 2 in the direction of the optical axis 5 of the objective 4. The focusing device 20 comprises at least one operating element 8 with which an operator controls the positioning of the objective 4 or of the microscope stage 6. For adaptation of the spatial arrangement of the operating element 8 to the needs of an operator, the microscope 1 according to the present invention is characterized in that the spatial arrangement of the operating element 8 relative to the microscope stand 2 is modifiable.

16 Claims, 9 Drawing Sheets

MICROSCOPE

CROSS REFERENCE TO RELATED APPLICATIONS

This application claims priority of German patent application 103 40 721.9, filed Sep. 4, 2003, which is incorporated by reference herein.

FIELD OF THE INVENTION

The present invention concerns a microscope.

BACKGROUND OF THE INVENTION

Microscopes of the kind cited above have been known for some time in the existing art. Very generally, in upright and inverted light microscopes, focusing of the specimen is accomplished by way of a corresponding positioning of the specimen relative to the objective, specifically in such a way that a specimen region to be detected is arranged in the focal plane of the objective. This can be achieved on the one hand by the fact that the objective, optionally together with the objective turret receiving the objective, is positioned along the optical axis relative to the specimen. In this case the specimen, for example mounted on a conventional specimen slide, is clamped in a corresponding holder on the microscope stage, this microscope stage then not being moved in the direction of the optical axis of the microscope objective. This type of focusing is usually utilized with inverted light microscopes. On the other hand, the microscope stage can be arranged movably relative to the microscope stand, and positioned in the direction of the optical axis for focusing. In this case the objective does not perform a motion in the direction of its optical axis relative to the microscope stand. The latter type of focusing is usually utilized with upright light microscopes. Focusing with the aid of the microscope stage also exists, for purposes of the present invention, when the microscope stage comprises a mechanism with which a specimen slide performs a positioning relative to the objective with the aid of a linear or pivoting motion controlled by a galvanometer, as is the case, for example, with the assignee's confocal laser scanning microscopes.

In both cases, a focusing of the specimen to be investigated is usually performed by the fact that an operator operates an operating element arranged on the microscope stand, as a result of which either the objective or the microscope stage is positioned, as a function of the operator's operation, relative to the microscope stand in the direction of the optical axis of the objective. The operating element is a rotary knob, but usually two rotary knobs (one rotary knob for fine drive and one rotary knob for coarse drive) which are arranged rotatably about a rotation axis and are directly or indirectly coupled to a shaft. Rotation of the rotary knob by the operator causes rotation of the shaft coupled to the operating element. The rotation of the shaft is in turn transferred, usually in mechanical fashion, into a linear motion of the microscope stage or the objective in the direction of the optical axis.

The operating element is usually arranged laterally at a certain height on one side wall of the microscope stand, usually a few centimeters away from a support surface on which the microscope stands. This arrangement of the operating element is optimized for an average operator's hand size, but it is arranged too low for operators with large hands, and too high for operators with small hands. For users with a hand size deviating from the average hand size, microscope operation is therefore fatiguing over the long term and as a result, not ergonomic in that respect.

SUMMARY OF THE INVENTION

It is therefore the object of the present invention to describe and refine a microscope of the kind cited initially with which the aforementioned problems are eliminated. In particular, the arrangement of the operating element is intended to be adaptable to an operator's needs, so that ergonomic microscope operation is additionally possible for operators irrespective of their hand size.

The above object is achieved by a microscope, a microscope stand; a microscope stage; at least one objective that, in a working position, defines an optical axis; a focusing device having at least one operating element that is provided on the microscope stand, wherein the operating element generates a relative motion between the objective and the microscope stage in the direction of the optical axis and the operating element sits on a first shaft of the focusing device and a side wall is defined by the microscope, wherein the focusing device is modifiable in terms of its position within the microscope stand in such a way that the spatial arrangement of the at least one operating element on the side wall of the microscope stand is adjustable.

What has been recognized according to the present invention is that for different operators with different hand sizes, microscope operation can be performed, in particular in ergonomic and efficient fashion over longer periods of time, when the arrangement or position of the operating element on the microscope stand can be modified. A microscope operator with a small hand size thus need not assist himself by, for example, placing alongside the microscope stand a book on which he then rests his hand for operation of the operating element and thereby decreases the distance between the operating element and the support surface on which the microscope stands. With an arrangement of the operating element on the microscope stand that is modifiable according to the present invention, the position of the operating element is individually adaptable to an operator's needs, the very particularly advantageous result being that fatigue of the user's arm or hand when operating the microscope can be largely prevented, at least with regard to focusing.

It is conceivable in principle that the operating element can be capable of being modified relative to the microscope stand in the horizontal and/or vertical direction relative to a support surface on which the microscope is arranged. Specifically when an operator has a short arm length, it may be advantageous to modify the arrangement of the operating element in the horizontal direction in such a way that he "brings the operating element closer" to himself.

Provision is preferably made, however, for the spatial arrangement of the operating element to be modifiable substantially in the vertical direction. A support carriage, with which the operating element is associated and which is movable along a guide provided on the microscope stand, could be provided for that purpose. The guide can be embodied in such a way that the operating element is adjustable on the microscope stand substantially in a direction parallel to the optical axis. In another embodiment, the spatial arrangement of the at least one operating element on at least one side wall of the microscope stand is adjustable substantially in the vertical and horizontal direction by means of a curved elongated hole.

The support carriage and the associated focus device are usually arranged in the interior of the microscope stand and are thus not visible to the operator. Concretely, an "association" of the operating element with the support carriage is to be understood to mean that the operating element is arranged non-modifiably in terms of its spatial arrangement relative to the support carriage. In this case, the spatial arrangement of the operating element with respect to the microscope stand could thus be varied in the vertical direction by way of a displacement of the support carriage or of the focus device.

The guide for the support carriage could comprise a ball guide, in particular a crossed roller guide, or a plain guide, in particular a dovetail guide. The support carriage could in that respect be mounted or guided in a manner comparable to an objective turret or microscope stage, those assemblies also being arranged displaceably in the direction of the optical axis of an objective.

Very generally, the operating element of the focusing device could comprise at least one pushbutton switch with which the objective or the microscope stage can be positioned. This is the case especially for microscope stands of research microscopes, in which motion of the objective or of the microscope stage is accomplished in motor-controlled fashion. The operating elements configured in the form of pushbutton switches are accordingly embodied as transducers for a control device having a corresponding motor. The microscope is then embodied in such a way that the first shaft of the focusing device is equipped with a coding disk that coacts with a sensor element which converts into electrical signals the rotation of the first shaft generated by the operating element. The sensor element is, for example, a light barrier that is immovably connected to the focusing device. At least one motor that effects the relative motion between the objective and microscope stage is provided in the interior of the microscope stand. For the activation thereof, the motor receives the signals generated by the sensor element.

With simple microscope stands in particular, however, the operating element comprises for focusing at least one rotary knob (operating element), mounted rotatably about a rotation axis, with which focusing is implemented in purely mechanical fashion. This type of focusing has become established not only because of its intuitive operation, and is also used in high-priced microscope stands, if applicable in addition to pushbuttons. In a preferred exemplary embodiment, therefore, the operating element is arranged rotatably about a rotation axis. It is preferably coupled to a shaft that is rotatable as a result of the rotation of the operating element. A configuration of this kind is, considered of itself, known from the existing art.

According to a very particularly preferred embodiment, the operating element is associated with a focus device, the focus device and thus also the operating element being arranged pivotably about a pivot axis. The focus device could be arranged on a support carriage that can be moved substantially in the vertical direction. As a result of this, the spatial arrangement of the operating element relative to the microscope stand could be modified by way of an upward or downward motion of the entire support carriage. On the other hand, given a specific position of the operating element associated with the focus device, the operating element could be pivoted about the pivot axis that is provided, so that horizontal and vertical modifications of the arrangement of the operating element relative to the microscope stand can thus be accomplished simultaneously. Preferably, however, provision is made for providing only a pivoting of the operating element about a pivot axis, the pivot axis being arranged on the microscope stand. The arrangement of the pivot axis on the microscope stand, the spacing between the operating element and the pivot axis, and the definition of the pivot angle range, enable a modification of the spatial arrangement of the operating element on the microscope stand in such a way that motions of the operating element relative to the microscope stand that have substantially a vertical and a horizontal directional component are possible. In particularly advantageous fashion, this embodiment can be embodied relatively easily in terms of design, so that the manufacturing costs therefor can be kept low.

For pivotable arrangement of the operating element, a focusing device could be provided which is arranged pivotably about the pivot axis and with which the operating element is associated. The focus device is preferably arranged in the interior of the microscope stand and in a manner not visible to an operator.

In principle, an operator manipulation of the operating element could be transferred mechanically or in another fashion for generation of a relative motion between the microscope stage and the objective. If the operating element comprises only an electrical transducer, an obvious choice is to transfer the signals generated by the transducer in electrical fashion, for example via a flexible cable connection, and to use them to generate a relative motion between the microscope stage and the objective. A rotatably mounted second shaft arranged substantially coaxially with respect to the pivot axis of the focusing device could be provided, in particular, for mechanical transfer of an operator manipulation of the operating element. The shaft could be embodied in such a way that a rotary motion of a shaft of the operating element is transferable to the second shaft, a prerequisite for this approach being that the operating element be rotatable about a rotation axis and be coupled to a shaft that is rotatable by rotation of the operating element.

In the context of a mechanical transfer of the manipulation of the operating element to the focusing device, provision is preferably made for transferring the rotary motion between the shaft of the operating element and the second shaft in positively engaged fashion. This could be effected, in particular, using at least two gears, one gear preferably being arranged nonrotatably on each shaft and the gears being in meshing engagement with one another. Teeth could also be provided on one shaft in at least one region, so that no gear need be provided on that shaft.

In the context of a pivotably mounted focus device, the rotary motion of the second shaft could be transferable in positively engaged fashion to a mechanism that moves the objective or the microscope stage relative to the microscope stand in the direction of the optical axis of the objective. A "positively engaged transfer" is to be understood in particular as the meshing engagement of at least two components configured in complementary fashion to one another. The two components could, for example, comprise two gears or a gear and a toothed rack.

For the case in which only a relative motion of the focus device (and thus of the operating element) with respect to the microscope stand in the vertical direction is accomplished, the rotary motion of a rotation axis of the operating element associated with the support carriage could be transferable in positively engaged fashion to a mechanism. That mechanism then once again moves the objective or the microscope stage relative to the microscope stand in the direction of the optical axis of the objective.

Very generally, at least one further intermediate shaft could be provided that serves for positively engaged transfer of the rotary motion of a shaft of the operating element to a mechanism that moves the objective or the microscope stage relative to the microscope stand in the direction of the optical axis of the objective. Corresponding step-down or step-up conversions of the rotary motion of the shaft of the operating element to the mechanism can thereby be attained, for example by way of a suitable selection of different gear diameters. This enables on the one hand rapid positioning of the objective or of the microscope stage along an entire positioning range, and on the other hand sufficient fine positioning of the objective or the microscope stage, so that a specific specimen region can be focused in controlled fashion and with sufficient resolution in terms of positioning motion.

Concretely, the mechanism for moving the objective or the microscope stage relative to the microscope stand in the direction of the optical axis of the objective could comprise a toothed rack. In this case the toothed rack is in meshing engagement with the second shaft or with a rotation axis of the operating element associated with the support carriage. Since the microscope stage or the microscope objective must be moved, for focusing, in the direction of the optical axis of the microscope objective, and that axis is usually oriented vertically, an obvious choice is also to align the toothed rack with its longitudinal axis vertical, so that the rotary motion of a shaft in meshing engagement with the toothed rack is converted directly into a linear motion in the vertical direction.

Once the operating element has then been arranged by an operator, in operator-specific fashion, in its spatial positions relative to the microscope stand, provision must be made for immobilizing the operating element in a specific position selected by the operator. Means with which the support carriage or the focus device can be immobilized on the microscope stand are provided for that purpose. This immobilization is preferably accomplished nonpositively, for example by wedging a part of the operating element with respect to the microscope stand.

In very particularly preferred fashion, the at least one operating element comprises a coarse drive and/or a fine drive. It is thus possible for a microscope operator to adjust the microscope stage or the objective, in a familiar manner, over a larger displacement range using the coarse drive and/or over a small displacement range using the fine drive. The coarse drive or fine drive can be embodied, in a manner known from the existing art, in motorized or mechanical fashion, a mechanical embodiment preferably being achievable by way of a recirculating ball drive system.

For a motorized embodiment of the focusing device, at least one motor could be provided with which a shaft of the focusing device is rotatable or drivable. A shaft associated with the operating element could preferably be rotated by the motor. The motor could comprise a stepping motor and, if applicable, a step-down gear drive.

In a preferred embodiment, a guide, on which the microscope stage or an objective turret receiving the objective is movable, is provided on the microscope stand. This guide could be a ball guide, in particular a crossed roller guide, or a plain guide, in particular a dovetail guide.

BRIEF DESCRIPTION OF THE DRAWINGS

There are various ways of advantageously embodying and refining the teaching of the present invention. In conjunction with the explanation of the preferred exemplary embodiments of the invention with reference to the drawings, an explanation is also given of generally preferred embodiments and refinements of the teaching. In the drawings.

DETAILED DESCRIPTION OF THE INVENTION

Figure 1:
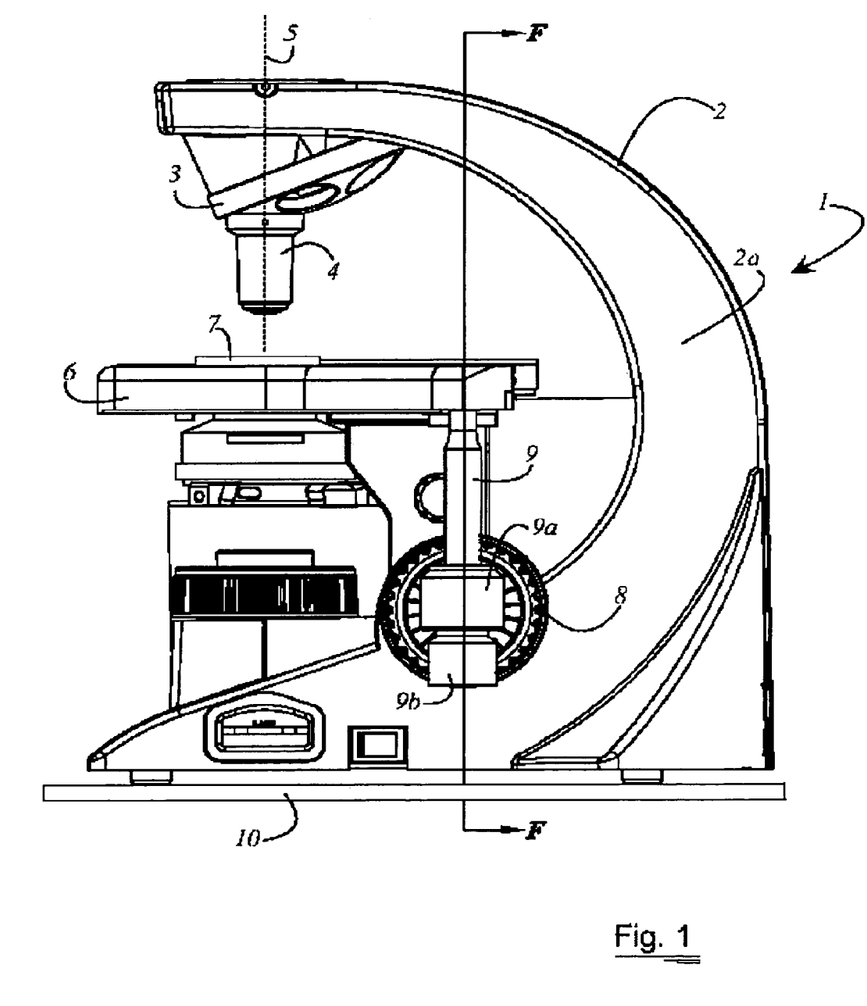
FIG. 1 is a side view of a microscope in which the teaching of the present invention is implemented.

FIG. 1 is a side view of a microscope 1 in which the teaching of the present invention is implemented. Microscope 1 encompasses a microscope stand 2. Microscope 1 stands on a support surface 10. Also provided on microscope stand 2 is a turret 3 that carries at least one objective 4. Objective 4 can be pivoted by means of turret 3 into a working position. Objective 4 possesses an optical axis 5 that, in the working position of objective 4, runs perpendicular to a microscope stage 6. A specimen 7 to be investigated can be placed on microscope stage 6. Microscope 1 comprises a focusing device 20 (see FIG. 5) serving to focus specimen 7, focusing device 20 being installed in the interior of microscope stand 2. With this focusing device 20, microscope stage 6 is positionable relative to microscope stand 2 in the direction of optical axis 5 of objective 4. Focusing device 20 carries two operating elements 8 (only one operating element 8 is depicted in the side view of FIG. 1). Operating elements 8 are provided on the two side walls 2a and 2b of microscope stand 2. With these operating elements 8, a user can enable the displacement of microscope stage 6 in the direction of optical axis 5. The displacement of microscope stage 6 results in a focusing of specimen 7 present on microscope stage 6. A displacement element 9 for microscope stage 6 is positioned directly in front of operating element 8. Displacement element 9 is connected to microscope stage 6 and enables a displacement of microscope stage 6 perpendicular to optical axis 5, by which means specimen 7 can be positioned in the image field of objective 4. Displacement element 9 encompasses an X element 9a that enables displacement of microscope stage 6 in the X direction. Displacement element 9 further encompasses a Y element 9b that enables displacement of microscope stage 6 in the Y direction.

Figure 2:
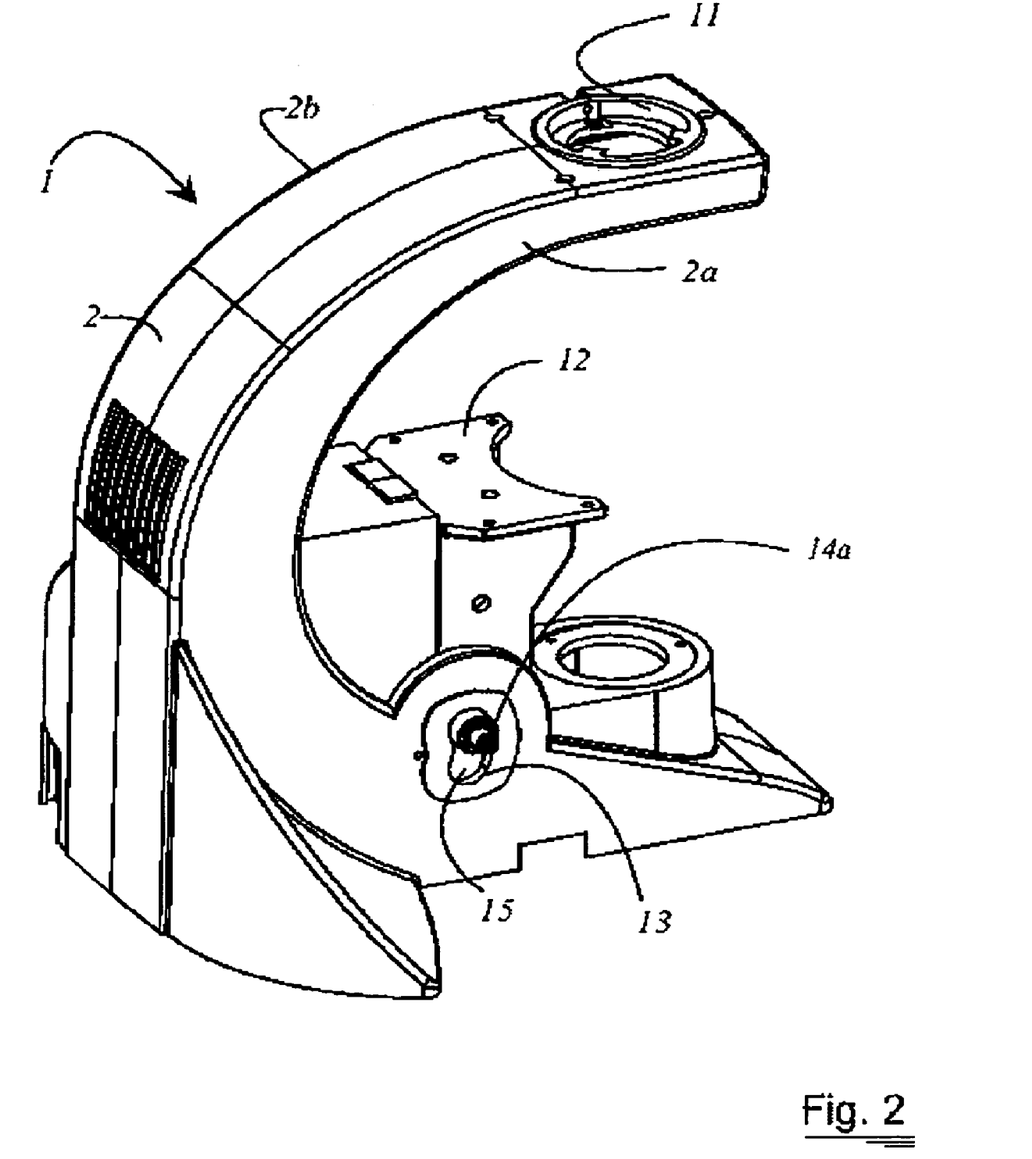
FIG. 2 is a perspective view of the microscope, in which several elements are removed so as to obtain a better impression of the microscope stand.

FIG. 2 is a perspective view of microscope 1 in which some elements are removed in order to obtain a better impression of microscope stand 2 and its configuration. Microscope stand 2 possesses a flange 11, e.g. for attaching a binocular eyepiece (not depicted). This is not, however, to be construed in any way as a limitation. Microscope stand 2 further comprises a holding element 12 for microscope stage 6 (see FIG. 1). Holding element 12 is movable by focus device 20 parallel to optical axis 5 of objective 4 that is located in the working position. Focusing device 20 installed in the interior of microscope stand 2 possesses a first end 14*a* and a second end 14*b* (see FIG. 5). First end 14*a* and second end 14*b* engage through an opening 15 on first and on second side wall 2*a* and 2*b*, respectively, of microscope stand 2. As already explained in the description relating to FIG. 1, an operating element 8 can be attached respectively onto first and second ends 14*a* and 14*b* of focusing device 20. In the exemplary embodiment depicted in FIG. 2, opening 15 possesses the shape of a curved elongated hole 13 that is embodied on the oppositely located side walls 2*a* and 2*b* of microscope stand 2. In the embodiment depicted in FIG. 7, focusing device 20 installed in the interior of microscope stand 2 likewise engages with first end 14*a* and with second end 14*b* (see FIG. 5) through opening 15 on first and on second side wall 2*a* and 2*b*, respectively, of microscope stand 2. In this embodiment, opening 15 is configured as longitudinal opening 51 in first and in second side wall 2*a* and 2*b*.

Figure 3:
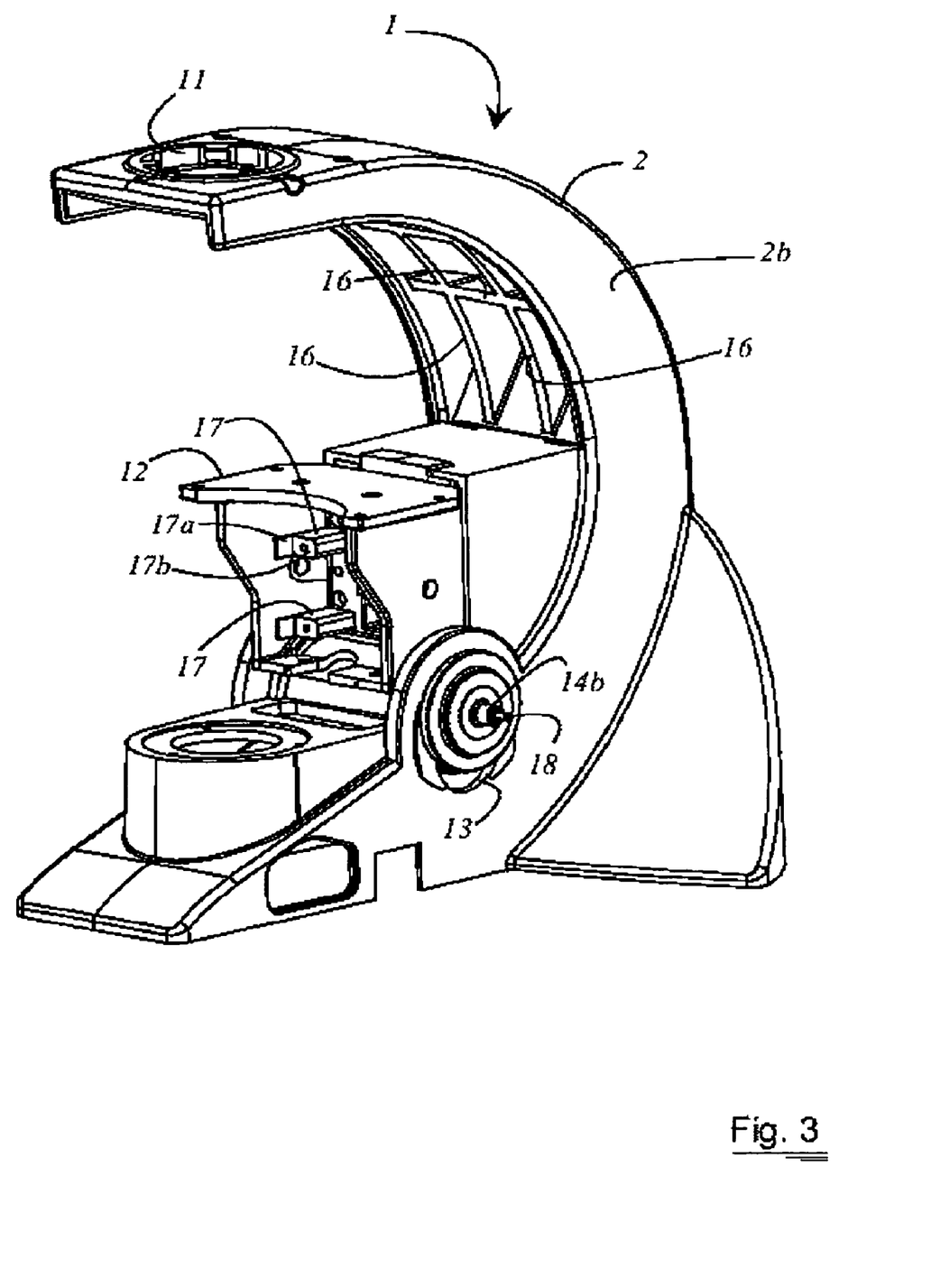
FIG. 3 is a perspective view of the microscope from the front.

FIG. 3 is a perspective view of microscope 1 from the front. In the interior, microscope 2 is constructed in part from multiple struts 16. This results on the one hand in a savings of material, and on the other hand in a stiffening of microscope stand 2. Several installation positions 17 are likewise configured in the interior of holding element 12 of microscope stage 2. Each of installation positions 17 comprises a first stop surface 17*a* and a second stop surface 17*b*. First and second stop surface 17*a* and 17*b* run perpendicular to one another and are configured in such a way that a component (not depicted) to be attached at that position can be attached with screws in the position without further alignment. In FIG. 3, second end 14*b* of focusing device 20 provided in the interior of microscope stand 2 is visible on second side wall 2*b*. A rotation axis 18 of focusing device 20 is likewise accessible via first and second side wall 2*a* and 2*b*.

Figure 4:
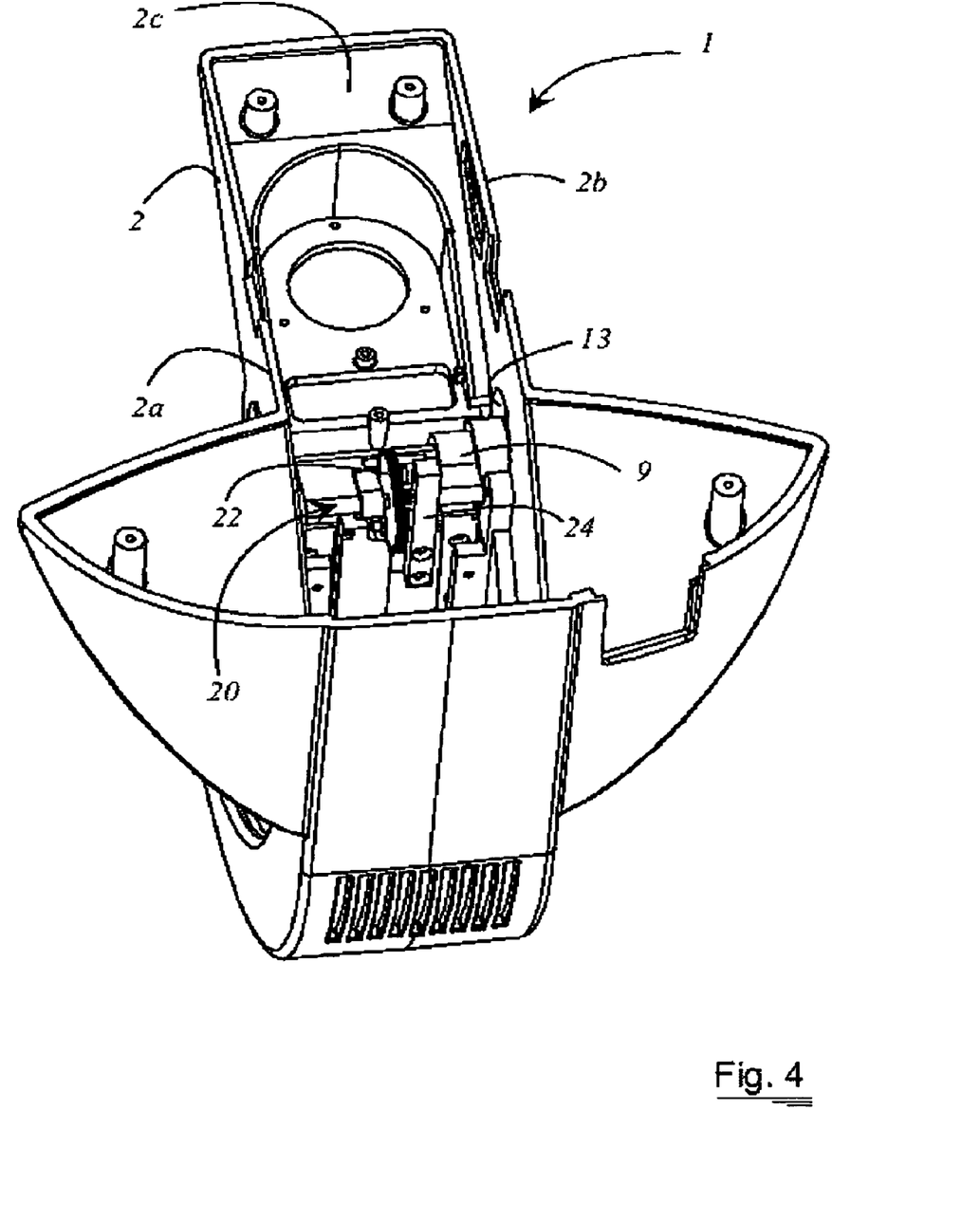
FIG. 4 is a three-dimensional view of a microscope stand according to the present invention from below, looking into the interior of the microscope stand.

FIG. 4 is a three-dimensional view from below microscope stand 2 according to the present invention, and thus offers a view into interior 2*c* of microscope stand 2. Focusing device 20 shown in FIG. 5 can be immobilized in interior 2*c* of microscope stand 2. For that purpose, the two ends 14*a* and 14*b* of focusing device 20 project out beyond the two side walls 2*a* and 2*b* of microscope stand 2 (see FIG. 2). Focusing device 20 encompasses one of several gears 22. One of the gears 22 of focusing device 20 is in meshing engagement with a mechanism 24 that transfers the rotary motion of one of the gears in positively engaged fashion to mechanism 24, which moves microscope stage 3 relative to microscope stand 2 in the direction of optical axis 5 of an objective 4.

Figure 5:
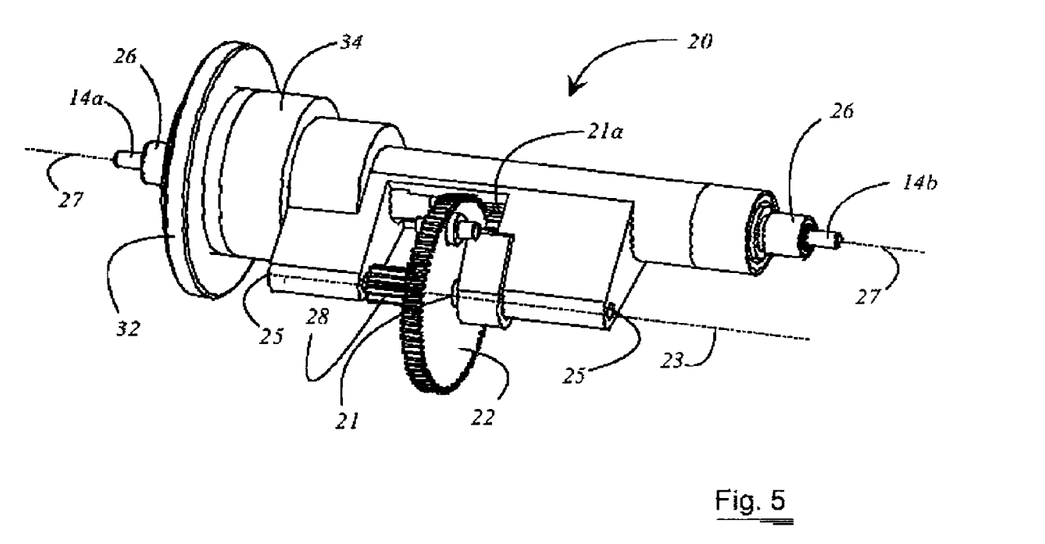
FIG. 5 is a three-dimensional view of an exemplary embodiment of a focusing device in accordance with an exemplary embodiment of the microscope according to the present invention.

FIG. 5 is a three-dimensional view of an exemplary embodiment of focusing device 20 in accordance with an exemplary embodiment of microscope 1 according to the present invention. According to this exemplary embodiment, focusing device 20 possesses a pivot axis 23 about which focusing device 20 is pivotably arranged. Pivot axis 23 is mounted pivotably on microscope stand 2 or in interior 2*c* of microscope stand 2.

Focusing device 20 encompasses two elongated orifices 25 through which can be introduced a pin or a second shaft (not shown in FIG. 5) with which focusing device 20 can be pivotably mounted on microscope stand 2. Pivot axis 23 of focusing device 20 of FIG. 5 accordingly extends centeredly through the two orifices 25, this being indicated in FIG. 5 with dashed lines. These orifices 25 carry a second shaft 21. Focusing device 20 possesses a further, first shaft 26 that is arranged parallel to pivot axis 23. First shaft 26 is arranged rotatably about an axis 27 and comprises first end 14*a* and second end 14*b* to which operating elements 8 for focusing device 20 are attached. Rotary motion is transferable between first shaft 26, focusing device 20, and second shaft 21 in positively engaged fashion. A gear 22 arranged nonrotatably on second shaft 26 is provided for that purpose. Teeth 21*a* that are in meshing engagement with the teeth of gear 22 are configured in a central region of first shaft 26.

The rotary motion of second shaft 21 is transferable in positively engaged fashion to mechanism 24 (see FIG. 4), which moves microscope stage 6 relative to microscope stand 2 in the direction of optical axis 5 of an objective 4. A second gear 28, joined nonrotatably to second shaft 21, is provided for that purpose on second shaft 21. Second gear 28 is in meshing engagement with toothed rack 30, which represents a part of mechanism 24 with which microscope stage 3 is movable relative to microscope stand 2 in the direction of optical axis 5 of an objective 4. Focusing device 20 is equipped on one side with a flange 32 with which focus device 20 is immobilized on or pressed against a side wall 2*a* or 2*b* of microscope stand 2. A clamping immobilization of focus device 20 on microscope stand 2 thus occurs.

Figure 6:
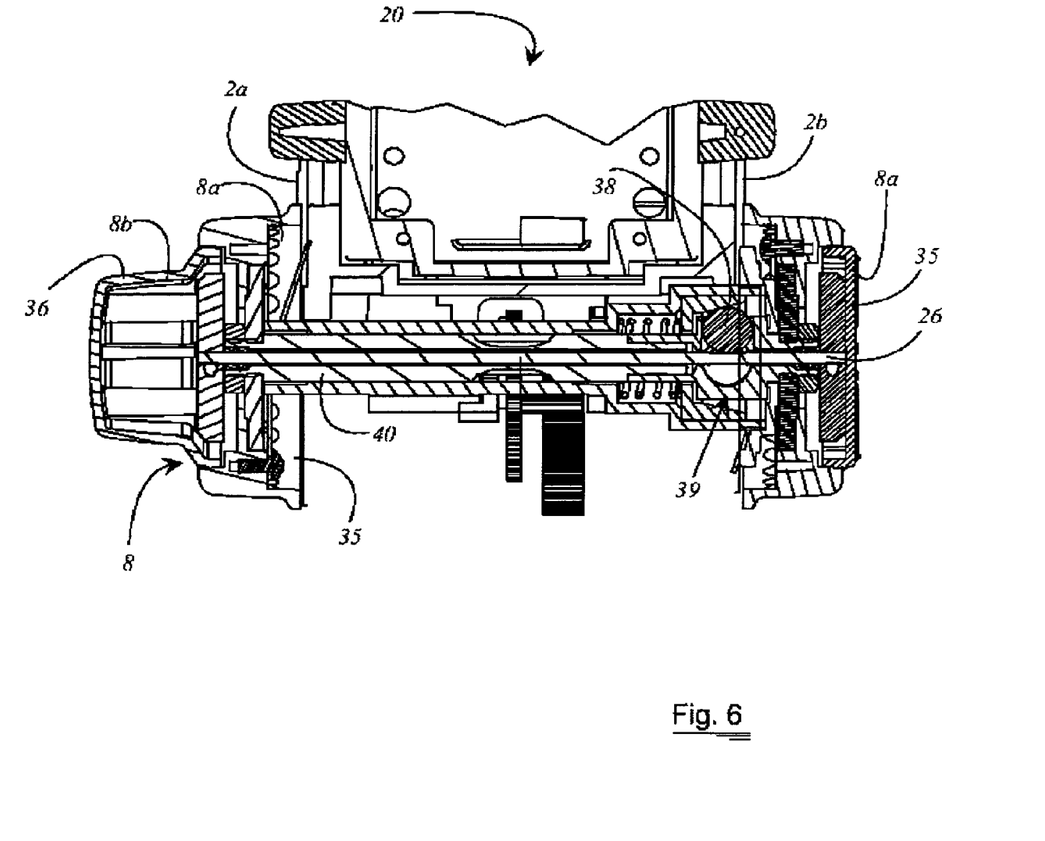
FIG. 6 is a detail view of the focus device along section line F-F of FIG. 1.

FIG. 6 is a detail view of focus device 20 along section line F-F of FIG. 1. FIG. 3 shows that operating elements 8 comprise a coarse drive 8*a* and a fine drive 8*b*. Coarse drive 8*a* of operating element 8 is operable by the operator via rotary knobs 35. Rotary knobs 35 of coarse drive 8*a* are nonrotatably connected to first shaft 26, so that a rotation of rotary knob 35 directly brings about rotation of first shaft 26. Two rotary knobs 35 are provided for coarse drive 8*a*, namely one on left side wall 2*a* and another on right side wall 2*b* of microscope stand 2. First shaft 26 associated with focus device 20 correspondingly extends transversely through interior 2*c* of microscope stand 2. At least one further rotary knob 36 that is arranged nonrotatably on a shaft 40 is additionally provided. Rotation of rotary knob 36 causes rotation of shaft 40 which, as a result of a nonpositive connection, rotates a ball 38 of a recirculating ball drive 39. This in turn transfers its rotation to first shaft 26 of operating element 8. Because of the step-down conversion ratio between shaft 40, ball 38, and housing 34 (see FIG. 4) of recirculating ball drive 39, shaft 26 is rotated with a large step-down ratio upon actuation of rotary knob 36, ultimately enabling fine positioning of specimen 7 relative to objective 4.

Figure 7:
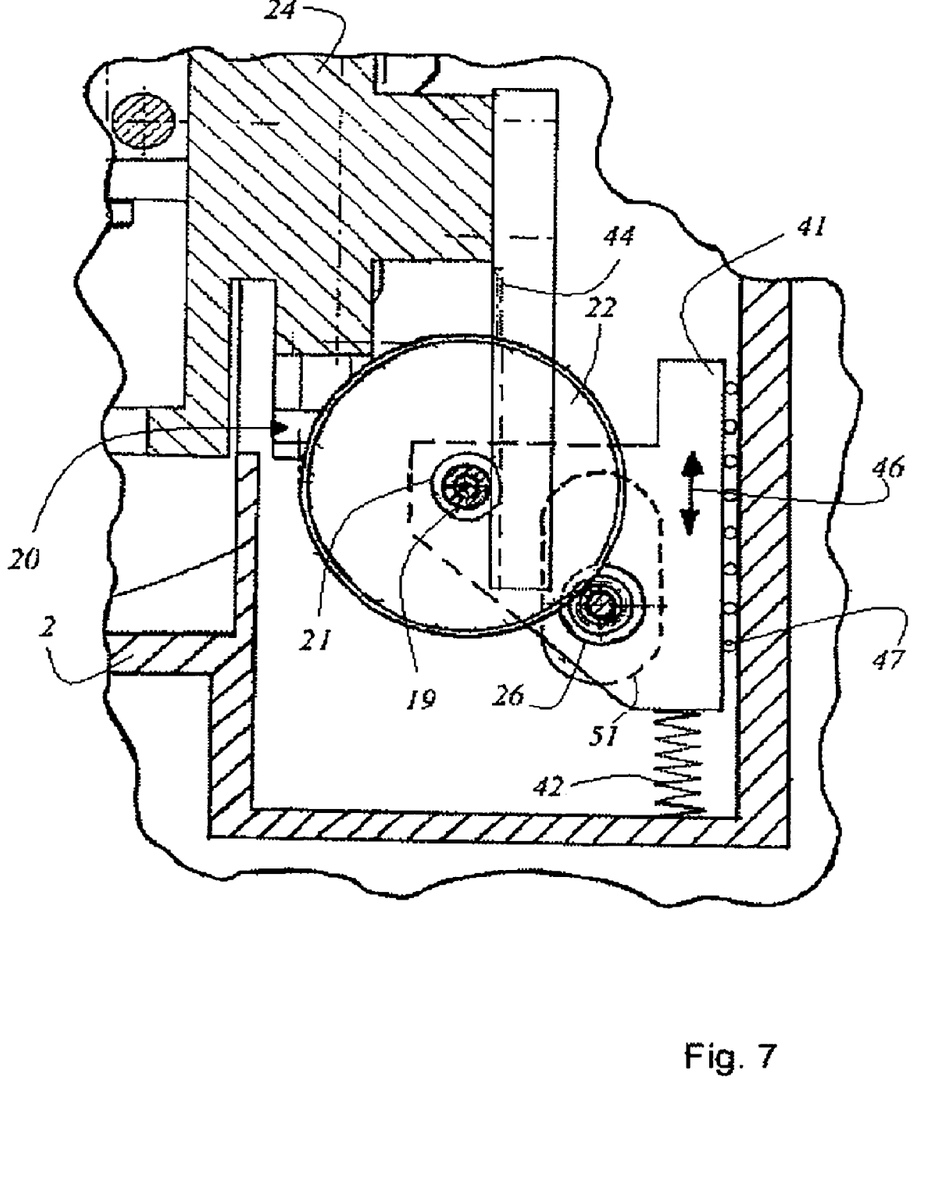
FIG. 7 is a sectioned view of a first exemplary embodiment of the present invention, only a vertical displacement of the focus device being possible.
Figure 8:
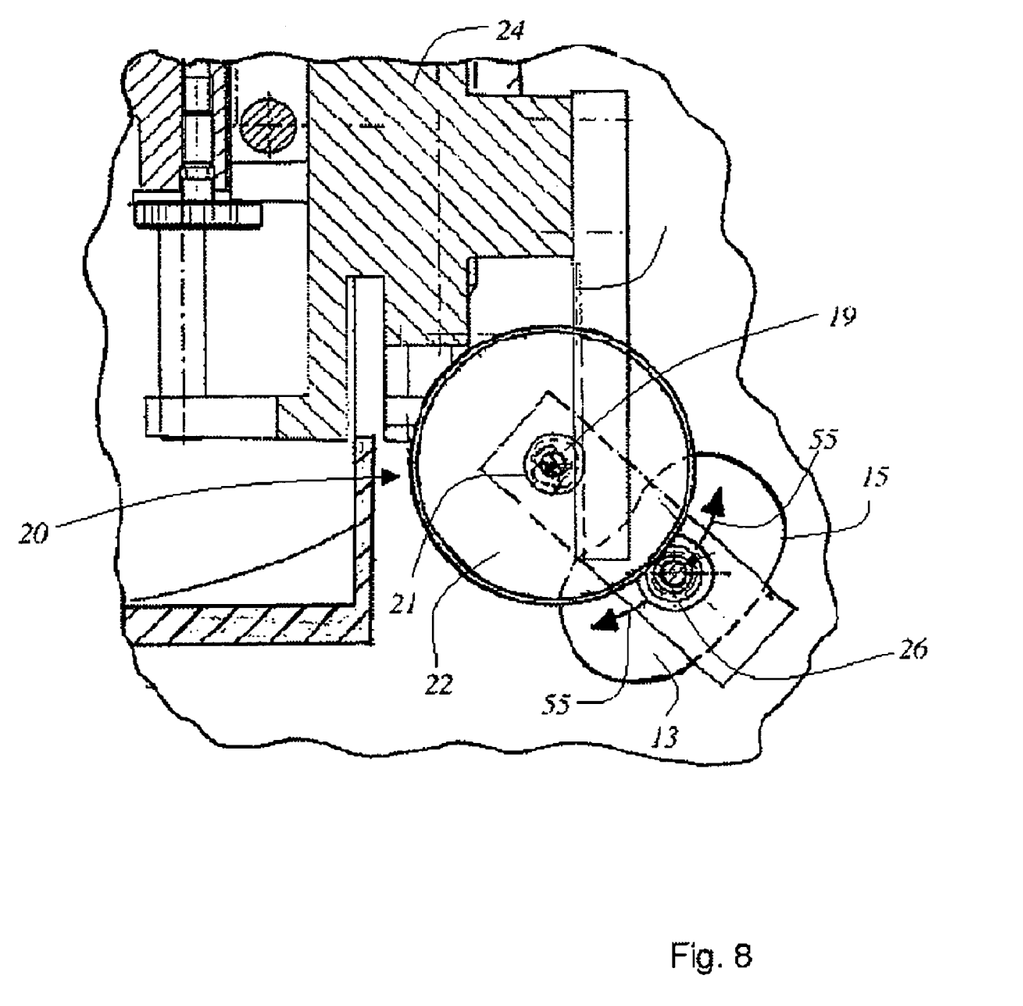
FIG. 8 is a sectioned view of a second exemplary embodiment of the present invention, a displacement of the focus device with a horizontal and a vertical component being possible.

In FIG. 7, focus device 20 is immobilized on a support carriage 41 as shown, and not on microscope stand 2. Downward motion of support carriage 41 is prevented by a spring 42 arranged on microscope stand 2. Shaft 21 mounted on support carriage 41 can project laterally out of microscope stand 2 through elongated opening or hole 13 indicated with dashed lines in FIG. 8. In the second exemplary embodiment, opening 15 provided in microscope stand 2 is embodied in the form of a circle segment or as curved elongated hole 13, the circle-segment shape being adapted to the distance between axis 27 of focus device 20 and axis 9 or first shaft 26 of operating element 8.

According to the exemplary embodiment of FIG. 7, the rotary motion of shaft 26, associated with support carriage 41, of operating element 8 is transferable in positively engaged fashion to mechanism 24 that moves microscope stage 6 relative to microscope stand 2 in the direction of optical axis 5 of objective 4. For positively engaged energy transfer, at least one further intermediate shaft 19 (see also FIG. 8) can be provided that serves for positively engaged transfer of the rotary motion of first shaft 26 to mechanism 24 that generates the relative motion between objective 4 and microscope stage 6 in the direction of optical axis 5 of objective 4. According to this exemplary embodiment, shaft 26 of operating element 8 that is in meshing engagement with gear 22 is embodied on support carriage 41 in rotatably mounted fashion, gear 22 being mounted nonrotatably on second shaft 21. Second shaft 21 is likewise rotatably mounted on support carriage 41. Second shaft 21 thus has the function of a further intermediate shaft that serves for positively engaged transfer of the rotary motion of first shaft 26 of operating element 8 to mechanism 24 that moves microscope stage 6 relative to microscope stand 2 in the direction of optical axis 5 of objective 4. The rotary motion of operating element 8 would thus (leaving aside the attainment of a predefined step-down conversion ratio) likewise be transferable directly from first shaft 26 to toothed rack 44 of mechanism 24.

According to the exemplary embodiment of FIG. 7, operating element 8 (not shown for simplicity's sake) is arranged movably substantially in the vertical direction, the vertical motion direction being indicated with double arrow 46. Support carriage 41, with which operating element 8 is associated, is provided for this purpose. Support carriage 41 is arranged movably along a guide 47 provided on microscope stand 2, guide 47 comprising a crossed-roller guide that is indicated schematically by way of individually depicted balls. In the event support carriage 41 shown in FIG. 7 is not immobilized on microscope stand 2, a downward motion of support carriage 41 is prevented by spring 42 arranged on microscope stand 2. Shaft 26 mounted on support carriage 41 can project laterally out of microscope stand 2 through longitudinal opening 51 indicated with dashed lines.

In the second exemplary embodiment, opening 15 provided in microscope stand 2 is embodied as a curved elongated hole 13 or as a circle segment, the circle-segment shape being adapted to the distance between pivot axis 21 of focusing device 20 and rotation axis 27 or shaft 26 of operating element 8. The circle-segment-shaped opening 15 of FIG. 8 corresponds to curved elongated hole 13 shown in FIGS. 2 and 3. The pivoting motion of focus device 20 is indicated here by curved double arrows 55.

Figure 9:
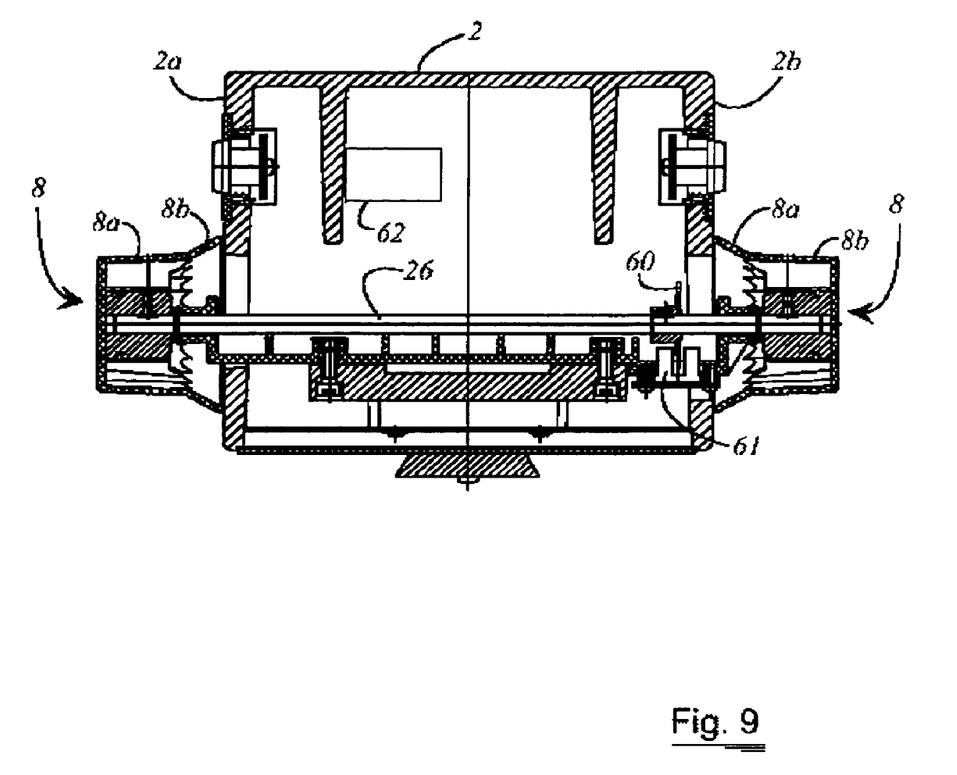
FIG. 9 is a sectioned view of a further embodiment of the invention in which an electronic coding of the rotary motion of the operating elements of the microscope is performed.

FIG. 9 is a sectioned view of a further embodiment of the invention in which an electronic coding of the rotary motion of operating elements 8a and 8b of microscope 1 is performed. Operating elements 8 provided on microscope stand 2 encompass a coarse drive 8a and fine drive 8b. Coarse drive 8a of operating element 8 is operable by the operator via rotary knobs 35. Rotary knobs 35 of coarse drive 8a are nonrotatably connected to first shaft 26, so that a rotation of a rotary knob 35 directly effects rotation of shaft 26. In the exemplary embodiment described here, shaft 26 is connected to a coding disk 60. Upon rotation of shaft 26 with operating elements 8, coding disk 60 is thus also rotated, and the rotation of the coding disk is detected with a sensor element 61 and converted into corresponding electrical signals that are used to activate a motor 62. Motor 62 serves to move microscope stage 3 in the direction of optical axis 5, thereby resulting in focusing of specimen 7 present on microscope stage 3. A displacement of operating elements 8 in terms of their position on microscope stand 2 is accomplished in accordance with the exemplary embodiments described in FIG. 7 and FIG. 8.

What is claimed is:

1. A microscope, comprising:
a microscope stand comprising a sidewall that is defined by the microscope and includes
an elongated opening;
a microscope stage;
at least one objective that, in a working position, defines an optical axis; and
a focusing device having at least a first shaft and at least one operating element that is provided on the microscope stand, wherein the operating element generates a relative motion between the objective and the microscope stage in the direction of the optical axis and the operating element sits on the first shaft of the focusing device and the side wall, and wherein the focusing device is modifiable in terms of its position within the microscope stand in such a way that the spatial arrangement of the at least one operating element on a side wall of the microscope stand is adjustable substantially in the vertical and horizontal direction by means of a curved elongated hole.

2. The microscope as defined in claim 1, wherein the focusing device is equipped with a pivot axis about which the focusing device is pivotable, together with the at least one operating element, in such a way that the position of the operating element on the at least one side wall of the microscope stand is adjustable.

3. The microscope as defined in claim 2, wherein a second shaft arranged substantially coaxially with the pivot axis is provided, and is embodied in such a way that a rotary motion of the first shaft is transferable by way of the operating element to the second shaft.

4. The microscope as defined in claim 3, wherein the rotary motion is transferable between the first shaft of the operating element and the second shaft in positively engaged fashion.

5. The microscope as defined in claim 4, wherein at least two gears are provided, one of the gears preferably being respectively arranged nonrotatably on each shaft, and the gears being in meshing engagement with one another.

6. The microscope as defined in claim 5, wherein the rotary motion of the second shaft is transferable in positively engaged fashion to a mechanism which generates the relative motion between the objective and the microscope stage in the direction of the optical axis of the objective.

7. The microscope as defined in claim 6, wherein at least one further intermediate shaft is provided which serves for positively engaged transfer of the rotary motion of the first shaft to the mechanism which generates the relative motion between the objective and the microscope stage in the direction of the optical axis of the objective.

8. The microscope as defined in claim 6, wherein the mechanism comprises a toothed rack that is in meshing engagement with the second shaft or with the axis associated with the support carriage.

9. A microscope, comprising a microscope stand; a microscope stage; at least one objective that, in a working position, defines an optical axis; a focusing device having at least one operating element that is provided on the microscope stand, wherein the operating element generates a relative motion between the objective and the microscope stage in the direction of the optical axis and the operating element sits on a first shaft of the focusing device and a side wall is defined by the microscope, wherein the focusing device is modifiable in terms of its position within the microscope stand in such a way that the spatial arrangement of the at least one operating element on the side wall of the microscope stand is adjustable substantially in the vertical and horizontal direction by means of a curved elongated hole.

10. The microscope as defined in claim 9, wherein the focusing device is equipped with a pivot axis about which the focusing device is pivotable, together with the at least one operating element, in such a way that the position of the operating element on the at least one side wall of the microscope stand is adjustable.

11. The microscope as defined in claim 10, wherein a second shaft arranged substantially coaxially with the pivot axis is provided, and is embodied in such a way that a rotary motion of the first shaft is transferable by way of the operating element to the second shaft.

12. The microscope as defined in claim 11, wherein the rotary motion is transferable between the first shaft of the operating element and the second shaft in positively engaged fashion.

13. The microscope as defined in claim 12, wherein at least two gears are provided, one of the gears preferably being respectively arranged nonrotatably on each shaft, and the gears being in meshing engagement with one another.

14. The microscope as defined in claim 13, wherein the rotary motion of the second shaft is transferable in positively engaged fashion to a mechanism which generates the relative motion between the objective and the microscope stage in the direction of the optical axis of the objective.

15. The microscope as defined in claim 14, wherein at least one further intermediate shaft is provided which serves for positively engaged transfer of the rotary motion of the first shaft to the mechanism which generates the relative motion between the objective and the microscope stage in the direction of the optical axis of the objective.

16. The microscope as defined in claim 14, wherein the mechanism comprises a toothed rack that is in meshing engagement with the second shaft or with the axis associated with the support carriage.

* * * * *